(Model.)
J. H. SHREINER.
Grain Drill.
No. 234,730. Patented Nov. 23, 1880.
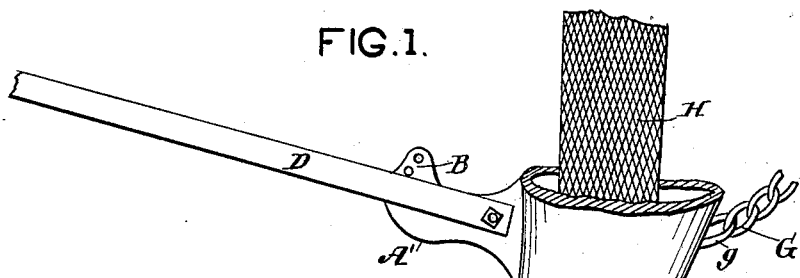
FIG. 1.
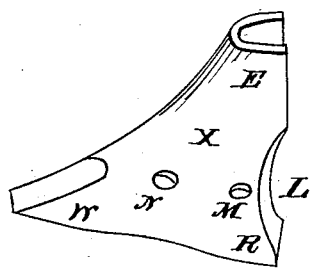
FIG. 3.
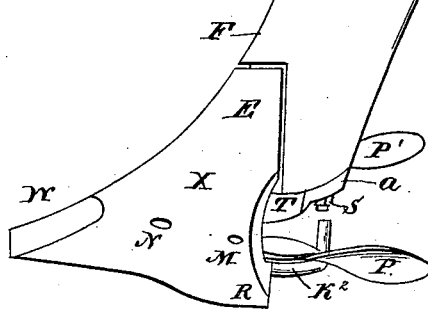
FIG. 2.
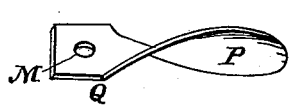
FIG. 4.
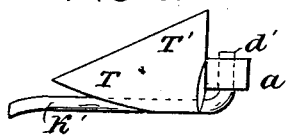
FIG. 5.
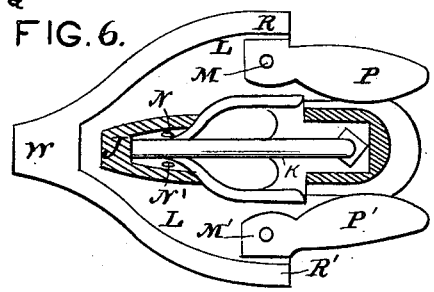
FIG. 6.
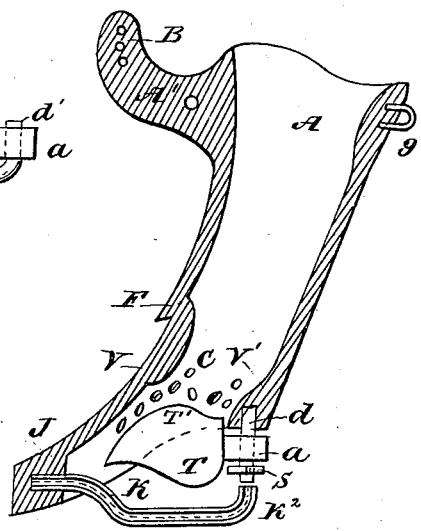
Witnesses.
U. M. Weaver
B. B. Hamlin
Inventor.
Jacob H. Shreiner
per Theophilus Weaver
Att'y
N. PETERS, PHOTO-LITHOGRAPHER, WASHINGTON, D.C.

UNITED STATES PATENT OFFICE.

JACOB H. SHREINER, OF HARRISBURG, PENNSYLVANIA.

GRAIN-DRILL.

SPECIFICATION forming part of Letters Patent No. 234,730, dated November 23, 1880.

Application filed July 27, 1880. (Model.)

*To all whom it may concern:*

Be it known that I, JACOB H. SHREINER, of Harrisburg, Pennsylvania, have invented a new and useful Improvement in Grain-Drills, of which the following is a specification.

My invention relates to improvements mainly in broadcast seed-drills in which the seed is distributed as it falls on a dividing-shield arranged in the lower part of the drill-boot, the drill point or hoe being specially patterned and recessed to allow the seed to fall widely, deposited between the heels of the shear-footings thereof, they being abruptly terminated at their widest cross-section, where they are supplemented by detachable return-bits or relay-shears, whereby the lifted mold is cleft and replaced upon the seed evenly and orderly over the whole drilled area, the clods being cut and disposed of more advantageously in the operation, and the hoes being also kept cleaner in the operation, than heretofore, a guard being also arranged in the hollow at the foot of said boot, whereby its openings for the exit of the seed are kept unclogged.

The principal objects or intents of my present invention are declared to be substantially as follows: first, the dwarfed hoe, made with short, simple, concaved mold-sides and wide furrow-opening treads prolonged rearward farther than the said mold-sides, in combination directly with drill-boot, made with forwardly-extended foot, all in one piece, the said parts being constructed and arranged in such manner that the mold may fall and close the furrow before said treads have passed sections thereof; second, an anti-clog guard arranged longitudinally in the foot of the drill, to keep the seed-aperture unstopped by ground, stones, &c.; third, a seed-distributer of peculiar construction, detachably mounted beneath the drill-boot and secured thereto, and arranged to present its body centrally beneath the drill-boot outlet, which is specially contracted by thickening the boot-wall to make said outlet funicular, and to cause the seed to fall collectedly onto the seed-distributer, to sow evenly on inclined as well as on level ground; fourth, supplemental blades attached to the rear ends of the dwarfed hoe by rivets entered through the shears thereof, and peculiarly directed and set to sever and assist in returning the mold pulverized upon the furrow without displacing the seed deposited therein; fifth, the combination of drill-boot, dwarfed hoe, anti-clog guard, and seed-distributer, all specially adapted and arranged for broadcast sowing. I attain these objects by mechanism illustrated in the accompanying drawings, in which—

Figure 1 represents a perspective view of my invention, the attaching parts being broken away. Fig. 2 represents a vertical sectional view of my drill-boot with the seed-distributer and the anti-clog guard inserted therein. Fig. 3 represents a perspective view of my drill-hoe with return-bits detached. Fig. 4 represents a perspective view of my left mold return-bit. Fig. 5 represents a perspective view of my anti-clog guard with a modified seed-distributer mounted thereon. Fig. 6 represents a bottom view of my grain-drill.

Similar letters denote similar parts throughout the several views.

The drill boot or tube A is made in the usual way at its top, with the arm A' to attach it to the drag-bar D, and with staple $g$ to attach thereto the stay-chain G. On said drill-boot, at about the mid-height of the front edge thereof, is formed the hook or shoulder F, with acute-angled notch thereunder, and the shank of said boot from thence down is rabbeted and curved to form a seat for the stock of the drill-hoe W X R, applied thereto, as shown in Fig. 1, two rivets or bolts, N N', retaining it on the foot J of said drill-boot below, while at its upper biased end, E, it is caught and retained in place by said hook F. Said hoe R W X is made in form as shown in Figs. 3 and 6, it being dwarfed or abruptly terminated at its rear end. Its point W is a triangular wedge, and its sides are simple or unreturned concaves X, they being shorter rearward than the shearing-treads R R', that the mold may be caused to fall from them suddenly to cover the seed before said treads have passed the same cross-section of furrow.

The treads or divergent shear-edges R R' are hollowed out beneath to form the offset L L next to the tread thereof, which offset affords, first, a square shoulder, against which are jammed the flat hilts Q Q' of the mold return-bits, joined firmly to the hoes by rivets or bolts M M', as shown in Figs. 1 and 6; second, a shelter or space in which the sown seed may fall broadcast and be covered unshoved. Said mold return-bits are made as right and left devices, of which the latter kind is shown in Fig. 4, on which the blade or bit P is twisted about half a turn inward to direct it contrary to the direction of the surface of the side of the hoe which it supplements. Said upturned edge serves as a cutter, by which the mold is severed as it falls on it from the advancing hoe W X R, a part of the shoved mold being turned inward on the middle of the sown furrow and a part being left on the margin of the same, thus distributing the mold to effectually and evenly cover the seed. The clods and sods encountered by said bits are favorably treated to secure their reduction, they being cut and torn considerably by them without being dragged as clogs on the drill. For the latter reason, too, the curve of the hoe-front W E and the boot-instep F are curved to retreat from the point W, that trash may be lifted by the mold to be readily dislodged and cleared from the drill, thus avoiding unclean work by the mold-boards.

Said return-bits Q P Q P' are made detachable for several reasons: First, they usually outlast the hoe W X R and need not be renewed as often as it does; second, they are thus out of the way in grinding and polishing the mold-sides of the said hoe, which thus becomes simple work, while in the case of corrugated and involved surfaces on hoes the work is difficult and less accessible; third, they are obstructionless, and do not interfere with the clearing of the hoe of the mold lifted by it, as it simply falls on the bits freely to a lower level and different in its operation from rearwardly-prolonged and involved shear-edges.

Returning to the construction of the interior of the drill-boot A, it will be observed that its wall is bulged inward at V V', thus forming a contracted passage at C at the cross-section of the tube, where the seed falls onto the dividing-ridge T' of the distributer, the bulge V' preventing seeds from falling to the rear undistributed, and the bulge V and a hump on the forward part of said ridge T' preventing seed from too plentifully gliding to the middle of the furrow over the point of the distributer. The sides of the distributer are extended slant-shields T, which direct the seed to fall broadcast in the hollow under the expanded hoe W X R. The sides of said distributer are preferably flared and somewhat triangular in outline, as shown in Figs. 2 and 6, for the purposes last stated. Said device is preferably attached by the tenon $a$ thereon to the base of the drill-boot, a stud, $d$, and nut $s$ holding it thereto, as shown.

A modified form of my distributer as I sometimes make it is shown in Fig. 5. Its body is pyramidal in form and its faces are plain triangles. It is attached in manner as last recited; or for refitting drills not suitably formed at the boot-heel for attaching, as described, a rod, K', is sometimes attached to the front part of the hoe or boot-foot, and the distributer is entered and supported on it in position, as shown in Fig. 5.

The anti-clog guard K is also a bent rod, located and directed as shown, attached in manner as last described as a chill or other joint in the toe-piece J of the drill-boot, and is extended longitudinally over the hollow of the foot of said boot, and has its rear end, K², bent and directed to rest on the parts $d\ s$, so, when the drill is thudded on rocks or other hard objects, thus guarding the said guard against breaking or derangement. Said guard may in like manner be inserted into the nose W of the hoe. The stud $d$, or its equivalent, may also be prolonged and bent to serve as the anti-clog guard, but is then less practical, as it is more liable to catch at objects passed and be deranged thereby. Its object is to guard the openings against clogging, whereat the seed is delivered broadcast into the furrow.

I do not claim or value an interior bulge or deflection of the drill-boot wall as a seed-distributer, as that is an insufficient device for the purpose when used alone; but I do claim the deflecting-bulges of the same, in combination with my interposed distributer, as guides to collect the seed centrally thereon to be certainly distributed therefrom both ways in sowing hill-sides.

Having adequately described my invention, what I desire to secure by Letters Patent of the United States is—

1. The dwarfed hoe R W X, having the short simple mold-sides $x$ and the wide furrow-opening treads R R', prolonged farther rearward than the said mold-sides, in combination directly with drill-boot A, made with forwardly-extended foot J, all in one piece, the said parts being constructed and arranged in the manner as and for the purposes set forth.

2. The anti-clog guard herein set forth, attached to the fore part of the drill-boot or the fore part of the hoe, and arranged longitudinally in the hollow of the drill-foot, substantially as and for the purpose set forth.

3. The detachable seed-distributer provided with horizontal tenon $a$, with sides T, equally flared from the summit T' both ways, and held sustained in position beneath the drill-boot opening by stud $d$ and nut $s$, in combination with the solid annular protuberance at the outlet of the drill-boot, to lessen said opening and guide the seed collectedly onto the middle of said distributer, causing its equal distribution both ways therefrom in sowing inclined as well as level ground, in the manner as and for the purpose set forth.

4. The supplemental blades P P', made separately from the hoe R W X, in combination therewith by rivets M M', entered through them and the rear ends of the shear ends R R', said blades being directed toward each other rearwardly and set above the level of the tread of said hoe to sever and return the mold without displacing the seed in the furrow, in the manner and for the purpose set forth.

5. The combination of the drill-boot A J, the hoe W X R, the seed-distributer T T', and the anti-clog guard K, all arranged and adapted for broadcast seed-drilling, substantially as set forth.

In testimony that I claim the foregoing as my invention I have hereunto set my hand, in presence of two witnesses, this 17th day of July, A. D. 1880.

JACOB H. SHREINER.

Witnesses:
   THEOPHILUS WEAVER,
   PETER STUCKER.